United States Patent
Andreoli

(10) Patent No.: US 7,850,000 B2
(45) Date of Patent: Dec. 14, 2010

(54) GUIDE ASSEMBLY FOR CONVEYOR OF ARTICLES WITH RESISTANCE TO BENDING

(75) Inventor: Andrea Andreoli, Modena (IT)

(73) Assignee: Rexnord Marbett S.R.L., Correggio (IT)

( * ) Notice: Subject to any disclaimer, the term of this patent is extended or adjusted under 35 U.S.C. 154(b) by 168 days.

(21) Appl. No.: 11/861,676

(22) Filed: Sep. 26, 2007

(65) Prior Publication Data

US 2008/0073183 A1    Mar. 27, 2008

(30) Foreign Application Priority Data

Sep. 26, 2006    (IT)    .......................... MI2006A1834

(51) Int. Cl.
*B65G 15/00* (2006.01)

(52) U.S. Cl. .................................. 198/836.1

(58) Field of Classification Search ............ 198/836.1, 198/836.3, 836.4, 445, 442, 860.1, 860.3, 198/861.1; 193/35 R, 35 C
See application file for complete search history.

(56) References Cited

U.S. PATENT DOCUMENTS

| | | | | | |
|---|---|---|---|---|---|
| 2,869,709 | A | * | 1/1959 | Zebley | .................. 198/686 |
| 3,934,706 | A | * | 1/1976 | Tice | .................. 198/454 |
| 4,962,843 | A | * | 10/1990 | Ouellette | .................. 198/453 |
| 4,976,343 | A | * | 12/1990 | Fuller | .................. 198/453 |
| 5,123,770 | A | * | 6/1992 | Trenner | .................. 403/338 |
| 5,143,200 | A | * | 9/1992 | Fuller | .................. 198/453 |
| 5,911,306 | A | * | 6/1999 | Ferrari | .................. 198/836.1 |
| 6,073,753 | A | * | 6/2000 | Marsetti | .................. 198/786 |
| 6,076,655 | A | * | 6/2000 | Marsetti | .................. 198/445 |
| 6,079,544 | A | * | 6/2000 | Donati et al. | .................. 198/446 |
| 6,196,375 | B1 | * | 3/2001 | Cozza | .................. 198/836.1 |
| 6,516,933 | B1 | * | 2/2003 | Ledingham | .................. 193/35 F |
| 6,561,340 | B2 | * | 5/2003 | Reatti | .................. 198/454 |
| 6,598,729 | B2 | * | 7/2003 | Marsetti et al. | .................. 198/452 |
| 7,147,098 | B2 | * | 12/2006 | Ledingham | .................. 198/453 |

FOREIGN PATENT DOCUMENTS

| | | |
|---|---|---|
| CH | 637084 A5 | 7/1983 |
| EP | 0888985 B1 | 11/2003 |
| EP | 0893373 B1 | 3/2004 |

* cited by examiner

*Primary Examiner*—Gene Crawford
*Assistant Examiner*—William R Harp
(74) *Attorney, Agent, or Firm*—Quarles & Brady LLP

(57) ABSTRACT

A guide for conveying articles includes a first and a second element for guiding and/or routing the articles along a transport path, the elements both having substantially planar portions, a mounting assembly for mounting the first and the second elements to a support bar, the support bar being connected to a frame of a conveyor, wherein the mounting assembly keeps the first and the second elements together, and wherein the planar portions of the first and the second elements are adapted to clamp the support bar there between.

14 Claims, 3 Drawing Sheets

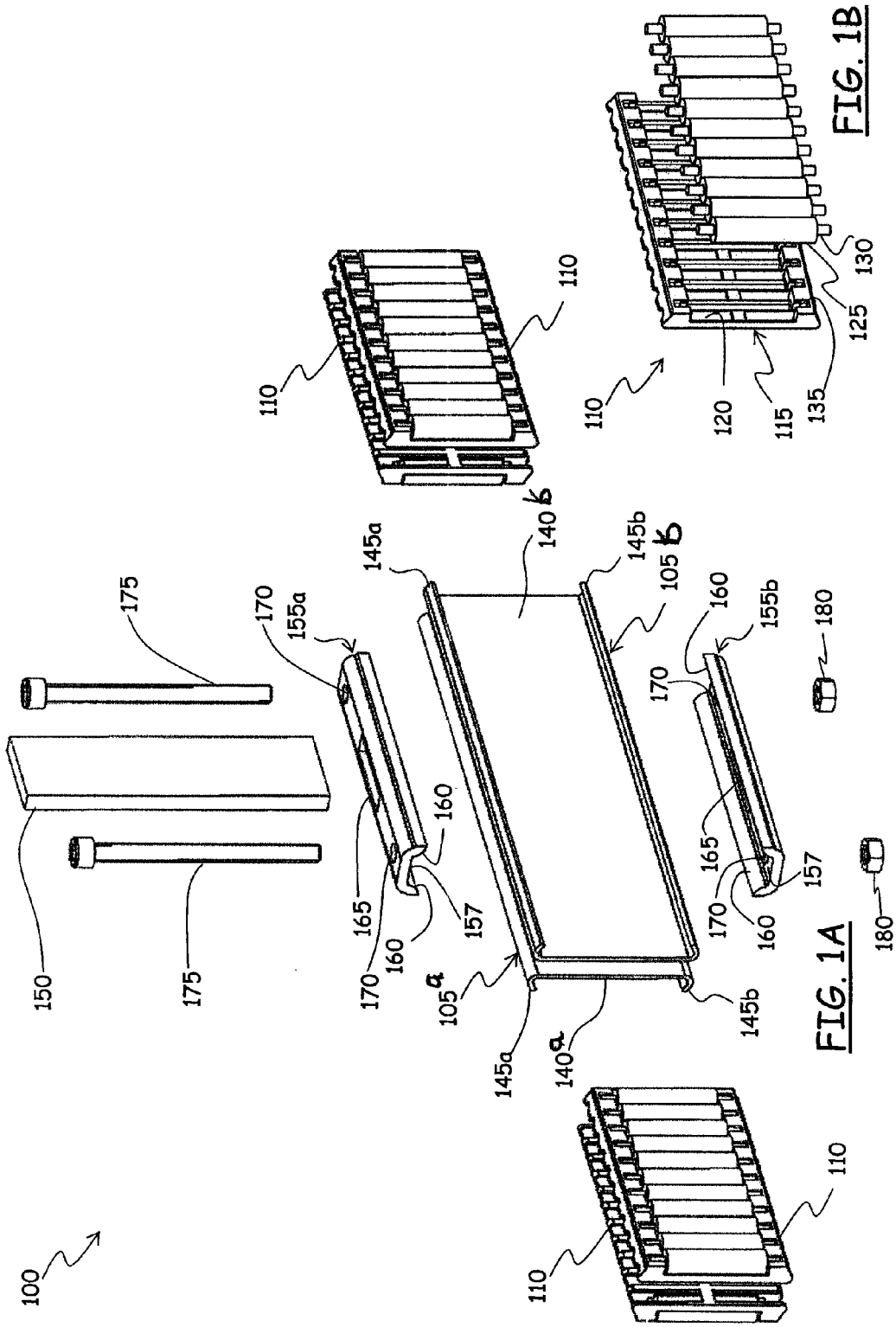

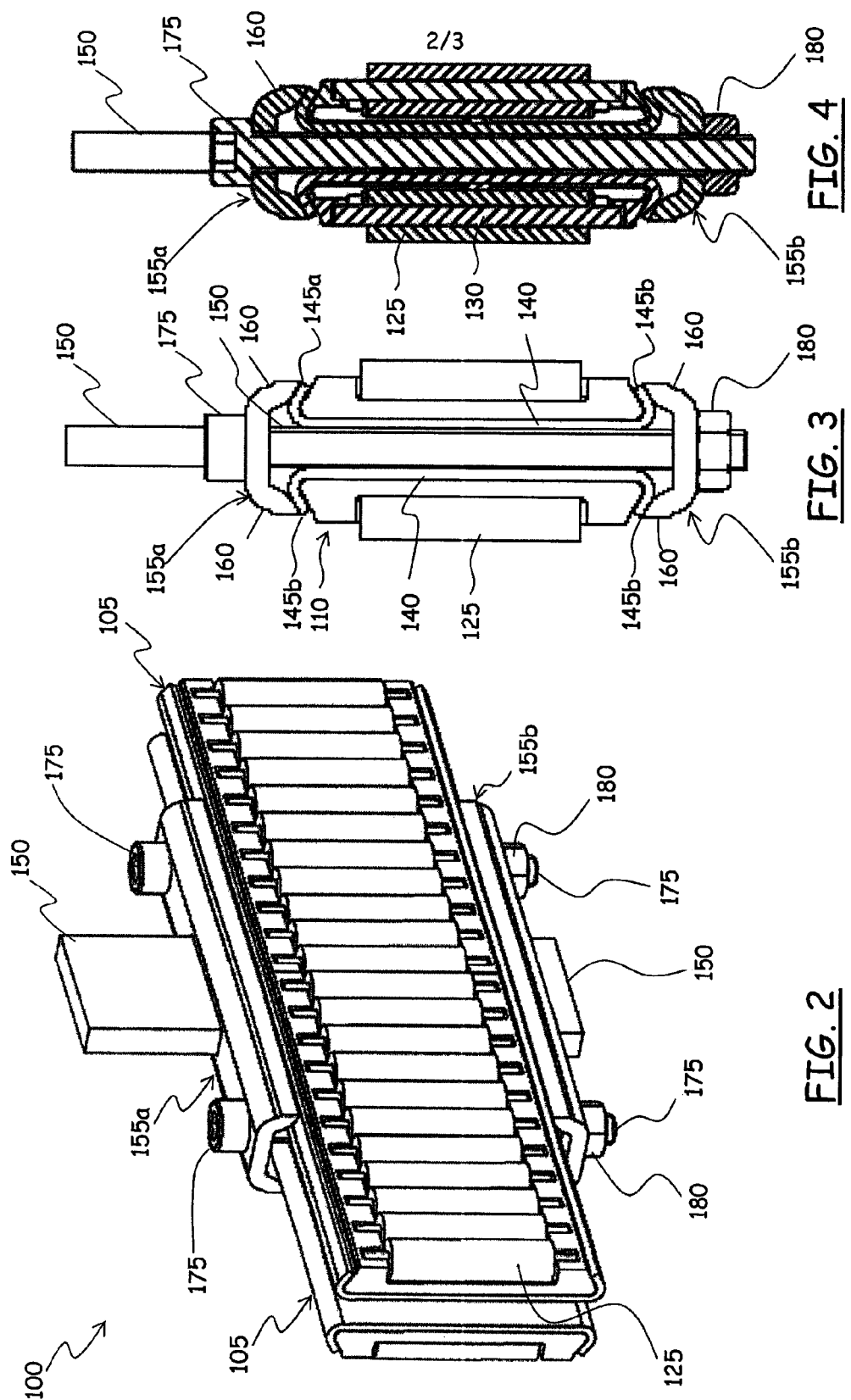

GUIDE ASSEMBLY FOR CONVEYOR OF ARTICLES WITH RESISTANCE TO BENDING

CROSS REFERENCES TO RELATED APPLICATIONS

This application claims foreign priority to Italian application number MI2006A001834, which was filed on Sep. 26, 2006.

STATEMENT REGARDING FEDERALLY SPONSORED RESEARCH

Not Applicable.

BACKGROUND OF THE INVENTION

The present invention relates in general to the field of conveyors of articles, such as, for instance, belt conveyors and chain conveyors, for example, although not exclusively, of the type employed for transporting bottled drinks and similar products. The invention more particularly relates to guides used in such conveyors of articles for the containment and the routing of the transported articles.

In conveyors of articles the use of guides is known to ensure the containment and the correct routing of the transported articles. Such guides are particularly necessary in correspondence of curves and bifurcations of the transport line, for instance in correspondence of accumulation stations, where a single flow of transported articles needs to be separated into two or more separate flows, for example to prepare the articles to the packaging.

The use of roller guides is very diffused, in which, for the engagement with the transported articles, freely rolling elements are provided for, typically arrays of idle rollers.

In particular, "bilateral" roller guides are known, having a double face, with two opposite operative surfaces, both intended to engage the transported articles: such guides are intended to be used as dividing central walls, to divide a single flow of transported articles into two or more separate flows, for instance generically parallel. In general, the known bilateral roller guides are made up of two arrays of idle rollers, set close to each other: a first and a second ideal surfaces, tangent externally to the rollers of the first and, respectively, the second array, form the first and the second operative surfaces of the guide. Examples of bilateral guides are provided in the European patent applications EP 0 888 985 and EP 0 893 373, and in the Swiss patent 637 084.

The roller guides are generally preferred to another type of guides, that could be defined as "static", not having rolling elements and constituted of bars, tubular elements or longitudinally extended profiled elements, for instance of steel; in fact, roller guides, differently from static guides, allow a contact substantially without sliding with the transported articles, and this avoids possible decelerations, jams or falls of the transported articles or superficial damages (for example, small abrasions). Particularly, a problem exhibited by static guides resides in the inevitable braking action that they exert, due to the friction, on the transported articles they guide; such braking action translates into an undesired effect of bridging of the front of the flow of transported articles, that hinders the regular advancement of the articles along the transport path.

Typically, the guides, particularly the central guides, are mounted in overhanging way, by means of clamps, to respective support bars that extend vertically and that are in turn fixed to the frame of the conveyor.

A problem affecting the guides for conveyors of articles is constituted by the twisting that the guides can suffer in consequence of lateral forces, transversal to the extension of the transport path, that in use are exerted on them by the transported articles. Particularly, the central guides, due to the stresses received by the transported articles, can suffer from undesired side bendings, that jeopardize the regular operation of the conveyor, originating for example phenomena of bridging of the flow of transported articles. It is therefore important that the guides are sufficiently rigid, particularly to withstand transversal stresses without deforming.

In view of the state of the art outlined above, the inventor has faced the problem of devising a guide for conveyor of articles that exhibited an improved resistance against bendings.

SUMMARY OF THE INVENTION

According to an aspect of the present invention, a guide incorporating the present invention includes: a first element longitudinally extended and intended in use to be arranged along a transport path for the containment and/or the routing of the transported articles, said first element comprising a substantially planar portion; at least one second element comprising a substantially planar portion and adapted in use to be put close to at least a longitudinal portion of the first element; and means associable to the first and the second elements and actuatable to urge the first and the second elements one towards the other, said means being adapted, in use, to clamp, between the planar portions of the first and the second elements, a support bar for the support of the guide to a frame of the conveyor.

BRIEF DESCRIPTION OF THE DRAWINGS

The features and the advantages of the present invention will be made apparent from the following detailed description of an embodiment thereof, provided purely by way of non-limitative example, description that will be conducted with the aid of the attached drawings, in which:

FIG. 1A is an axonometric and exploded view of a portion of a guide for conveyor of articles, particularly a roller guide, according to an embodiment of the present invention;

FIG. 1B is an axonometric and exploded view of an idle-roller module of the guide of FIG. 1A;

FIG. 2 shows, always in axonometry but assembled, the guide of FIG. 1A, fixed to a respective support element for mounting it to the frame of a conveyor of articles;

FIG. 3 is a side view, from the left, of the guide shown in FIG. 2;

FIG. 4 is a sectional view according to a transversal plane of the guide of FIG. 2.

DESCRIPTION OF THE PREFERRED EMBODIMENT

Figure 5:
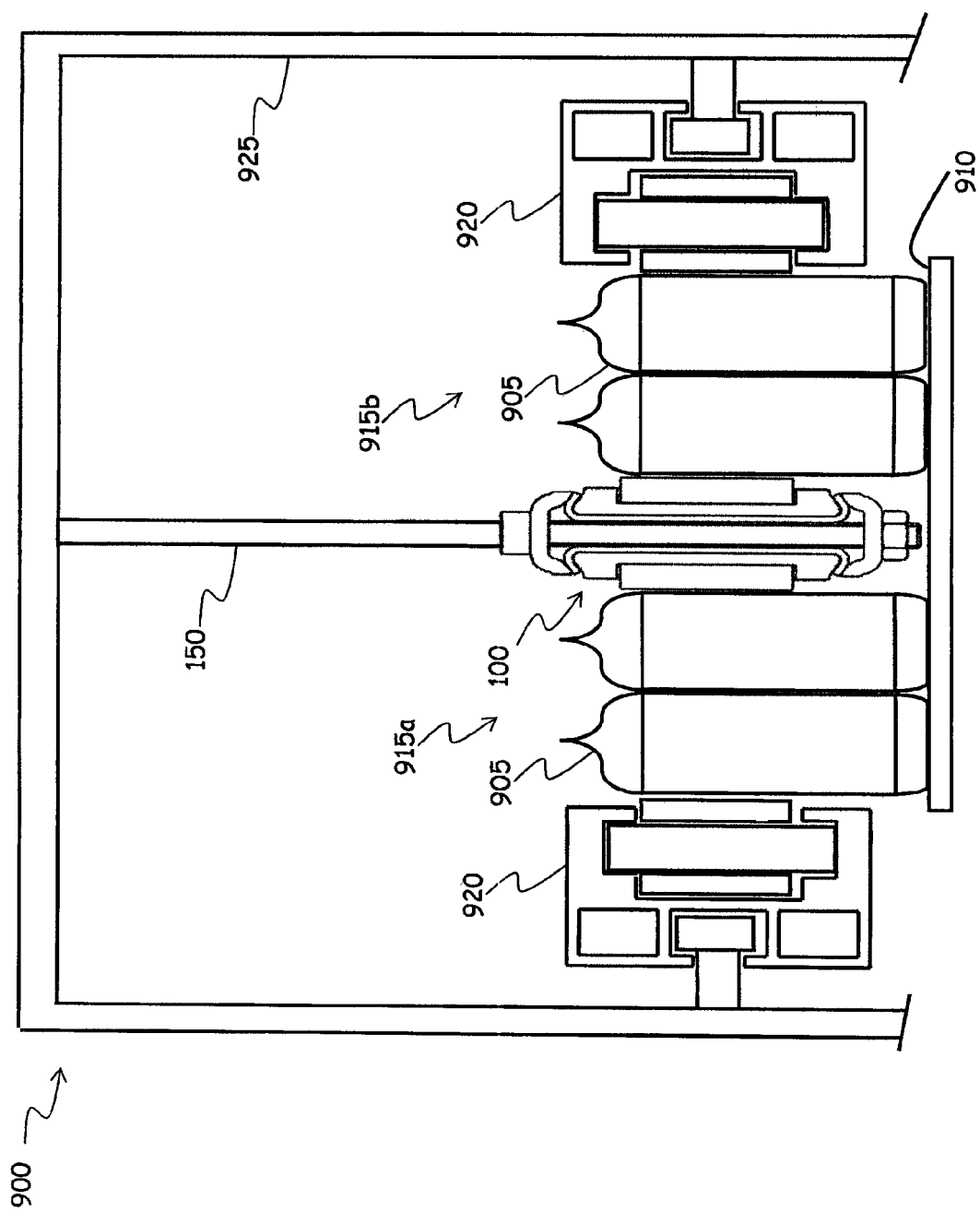
FIG. 5 show schematically, in front view, an exemplary application of the guide of the preceding figures to a conveyor of bottles for drinks.

Making reference to the drawings, there is shown in different views sights (exploded axonometry, axonometry after the assemblage, side view and transversal cross section) a portion of a guide for conveyor of articles according to an embodiment of the present invention, particularly a roller guide adapted to be used as a central guide for a conveyor of articles, i.e. as a dividing wall, for the partition of a single flow of transported articles into two separate flows.

The conveyor of articles, an example of which is schematically shown in FIG. 5, can be any conveyor known in the art, for instance a chain or a belt conveyor, for transporting articles such as, for instance, glass or plastics bottles for drinks, or jars or pots of preserves, and the like. The type of conveyor and the nature of the articles that the conveyor is intended to transport are not to be regarded as limitative for the present invention.

The (portion of) guide of the exemplary embodiment of roller guide here considered, overall identified with the reference numeral 100, comprises a pair of support elements 105 having a longitudinal development, for instance constituted by profiled elements. Particularly, the profiled element 105 can be in metal, for instance in aluminum or other suitable material, to confer a suitable degree of rigidity to the guide 100. The support elements 105, which can be made available in sections of different lengths, for instance of some meters, are additionally preferably plastically deformable, for instance by rolling, so as to be capable of adapting also to curved sections of the articles' transport path.

Each support element 105 is adapted to support one or more idle rollers module 110, arranged in longitudinal succession to form a queue without substantial discontinuity. The structure of the generic idle rollers module 110 is more clearly visible in FIG. 1B, and it is composed of a roller-carrying frame 115, comprising a plurality of housings 120 for the rollers, arranged in longitudinal succession. The roller-carrying frame 115 can be for instance made in plastic material, for example acetalic resin. Each housing 120 is adapted to accommodate a respective roller, that, in the example here considered and shown, comprises a cylinder 125 mounted in freely rotatable way on a shaft 130 whose ends protrude with respect to the cylinder 125; the cylinders are for instance in plastic material, particularly but not limitatively polyethylene, acetalic resin or polyamide; the shafts 130 may in turn be made in plastic material, for instance of the same material as the roller-carrying frame 115. The housings 120 include, above and below, seats 135 adapted to receive by insertion, for example by snap-fit, the ends of the shaft 130 that protrude from the cylinders 125. The roller-carrying frame 115 is shaped in such way that, when the rollers are mounted thereon, the cylinders 125 are exposed from one side, and can freely rotate around the axes of the respective shafts. The use of rollers in which the rotating elements are formed by cylinders is however not to consider limitative: in alternative embodiments of the invention, the rollers can have different shapes, for instance they may each comprise two or more spherical rotating elements, inserted in freely rotatable way on a shaft.

The support element 105 is in particular shaped so to have a generically "C"-shaped transversal section, with a substantially planar part 140 of prevalent extension and two opposed appendixes 145a and 145b, bent on the same side. The roller-carrying frame 115 of the generic idle rollers module 110 has dimensions such as to be able to be associated with the support element 105 by insertion between the two bent appendixes 145a and 145b from one or the other of the two ends of the support element 105, with the rollers placed on the opposite side with respect to the planar part 140 of the support element 105 and, once inserted, to be held in place by the bent appendixes 145, as visible in FIG. 2. The rollers may in any case be mounted onto the roller-carrying frame 115 of the generic idle rollers module 110 after the latter has been inserted into the support element 105.

The two support elements 105 are mounted, with the backs of the respective planar parts 140 facing to each other, to a bar 150, adapted in turn to be fixed to a frame of the conveyor of articles on which the guide 100 has to be installed, as shown schematically and in simplified way in FIG. 5. In the shown example, the bar 150, for instance made of metal, has rectangular cross section, however the specific shape of the bar 150 is not to be considered limitative for the present invention, being preferable, as it will appear from the following description, that the bar 150 has a flat portion of sufficient extension.

According to an embodiment of the present invention, for assembling the two support elements 105 to the bar 150, a mounting assembly 151 including a pair of properly shaped plate-like first and second jaw elements 155a and 155b are provided for, as described hereafter, adapted to be arranged along corresponding portions of the bent appendixes 145a and, respectively, 145b of the two support elements 105 put close to each other. The two plate-like elements 155a and 155b are shaped in such a way that they have generically "C"-shaped transversal section, and more particularly in such a way that each of them has a substantially planar central portion 157 and two side wings 160 bent on the same side, so as to form, with the central portion 157, angles approximately complementary to the angles formed by the bent appendixes 145a and 145b with the planar part 160. The two plate-like elements 155a and 155b are each one provided, in the central portion 157 thereof, of a through slot 165, located in a position substantially intermediate along the prevalent dimension of the plate-like element, and of two through holes 170. The slot 165 has length and width such as to allow the passage of the bar 150; the holes 170 have diameter such as to allow the passage of the stems of two screws 175, in turn having diameter preferably slightly lower than the thickness of the bar 150 (for instance, in case the bar has thickness of 6 mm, it is preferable to use M6 screws, in case the thickness of the bar is of 8 mm, it will be preferable to use M8 screws).

For assembling the guide 100, after having inserted into the two support elements 105 the desired number of idle rollers modules 110 (corresponding for instance to the longitudinal extension of the support elements 105), the two support elements 105 are put close the each other from the side of the backs of their planar parts 140. The two plate-like elements 155a and 155b are then placed on corresponding portions of the bent appendixes 145a and, respectively, 145b of the two support elements 105 put close to each other, so that the through slots 165 formed therein are vertically aligned. Then, the screws 175 are inserted into the holes 170, and screw nuts 180 are screwed on their free threaded ends, without however tightening them, i.e. leaving the nuts loose. In this way, the two support elements 105 are kept properly spaced apart, but the two plate-like elements 155a and 155b can still be made to slide along the support elements 105, to bring them in the desired position, where a bar 150 is mounted to the frame of the conveyor.

The bar 150 is then inserted into the slots 165 of the two plate-like elements 155a and 155b, and the two nuts 180 are tightened. The action of axial traction exerted by the heads of the screws 175 and by the nuts 180 in consequence of the tightening of the nuts 180 on the two plate-like elements 155a and 155b causes the latter to behave as jaws, clamping therebetween the two support elements 105. Particularly, the peculiar shape of the plate-like elements 155a and 155b, with the side wings 160 bent in the way described above, creates a system of slanted planes with the bent appendixes 145a and, respectively, 145b of the two support elements 105 put close to each other, that transforms the action of traction exerted by the screws and by the nuts in a transversal action of compression on the two support elements 105.

In this way, when the nuts are fully tightened, a portion of the bar 150 result tightly clamped between the backs of the planar parts 140 of the two support elements 105 put close to each other. It is observed that, thanks to the fact that the screws 175 have slightly smaller diameter compared to the thickness of the bar 150, the backs of the planar parts 140 of the two support elements 105 abut onto the bar 150, and not onto the screws 175. As a result, it is possible to exploit the significant rigidity of the bar 150 to confer resistance against twisting and side bending of the guide 100.

In FIG. 5 there is schematically shown, in front view, a conveyor 900 for the transport of bottled drinks 905, for instance plastic bottles. The bottles are transported while resting on a transport plane 910, that is made to advance along a transport path by known moving means (not shown). A central guide 100 is provided, of the type previously described, mounted to a frame of the conveyor, schematized with 925, to initially separate a single flow of bottles into, in the example, two parallel flows 915a and 915b. Lateral guides 920 having a single operative surface are used for the lateral containment of the bottles. Preferably, the central guides 100 are provided, in correspondence of one of their ends, of suitable flow-breaker terminals (not shown) for breaking the flow of the transported articles, so as to facilitate the separation of the flow of articles.

The invention has been here described making reference to one exemplary embodiment thereof, however those skilled in the art can easily devise variations to the shown embodiment, or new embodiments, for meeting contingent needs, without departing from the scope of protection defined by the appended claims.

For example, instead of the screws 175 other means can be used, such as for example elastic springs to be applied to the two sides of the two plate-like elements, and adapted to exert a sufficient force on the latter. It is in general possible to use any suitable member adapted to exert an action of traction of the two plate-like elements one towards the other.

Instead of the two plate-like elements 155a and 155b with slot for the passage of the bar 150, four plate-like elements may be used, to be applied in pair to the support elements at the two sides of the bar 150. It is in general possible to use any member adapted to exert, on the two support elements 105 put close to each other, a urging action of the one towards the other, so as to tightly clamp the bar 150 therebetween.

The slot 165 provided in intermediate position in the two plate-like elements 155a and 155b might have greater longitudinal extension compared to the width of the bar 150, so as to allow the tilted mounting of the support elements 105 to the bar; this can be useful to realize guides for non-planar sections of the transport path of the articles.

The wings 160 of the two plate-like elements 155a and 155b can also be constituted by a bent edge, bent according to an arc of circle, being sufficient that the side wings of the jaws are shaped in such a way as to transmit to the bent edges 145a and 145b of the support elements 105 an action with vertical component correspondent to the action of the screws 175 that, as a consequence of the slanted plane of contact, develops a horizontal component necessary for the action of compression of the back of the support elements on the bar 150.

Moreover, although described making reference to a roller guide, nothing prevents from applying the present invention also to static guides, not provided with rolling elements for the contact with the transported articles, and made for instance of extruded profiled elements in metal or synthetic material. For example, although not limitatively, the support elements 105 could be intended to support elements of engagement with the transported articles, such as bars, tubular elements or profiled elements extended longitudinally, or the support elements 105 could be shaped in such a way as to constitute by themselves the elements of engagement with the transported articles.

Another possibility consists in exploiting the present invention for the realization of lateral guides, rather than central guides as the one previously described by way of example. For instance, one of the two support elements 105 could be used only for tightly clamping the bar 150, and not be intended to support idle roller modules or other elements of engagement with the transported articles; in such case, such support element which is not intended to support idle rollers modules or other elements of engagement with the transported articles could be constituted by one or more sections, of reduced longitudinal extension limited to a length sufficient to achieve the tight clamping of the bar 150.

Although in the present description reference has always been made to support bars of generally rectangular section, this should not be considered a limitation: the support bar could be also cylindrical, or have other forms; in such a case, substantially planar portions could be formed on the bar, for instance for milling, for the abutment of the support elements.

I claim:

1. A guide for conveying articles, comprising:
   a first and a second element for guiding and/or routing the articles along a transport path, the elements both comprising substantially inwardly facing portions and opposed outwardly extending edge portions;
   a support bar extending between said inwardly facing portions of said first and second elements; and
   a mounting assembly mounting the first and the second elements to the support bar by engaging said opposed edge portions, wherein the mounting assembly keeps the first and the second elements together, the inwardly facing portions of the first and the second elements facing the support bar there between;
   wherein said mounting assembly includes at least a first jaw element and a second jaw element, each of said first jaw element and said second jaw element engaging at least one edge portion of each of said first and second elements; and
   wherein said first element includes at least one of a roller guide and a static guide for engagement with the transported articles.

2. The guide according to claim 1, wherein said edge portions of each of said first and second elements being opposed to each other in a direction transversal to the direction of longitudinal extension of the first element, and wherein upon urging the first and the second jaw elements one towards the other in said direction transversal to the direction of longitudinal extension, the first and the second jaw elements and the edge portions of the first and the second elements being shaped in such way that urging one towards the other of the first and the second jaw elements in said transversal direction urges the first and the second elements toward each other clamping the support bar there between.

3. The guide according to claim 2, in which said edge portions of the first and second elements comprise appendixes bent with respect to said inwardly facing portions of the first and second elements, and said first and second jaw elements each comprise a substantially planar part and side wings bent and adapted to abut said bent appendixes.

4. The guide according to claim 2, in which said first and second jaw elements are forced together by traction to clamp the support bar there between.

5. The guide according to claim 1, in which said first element includes said roller guide, and said roller guide includes idle rolling elements.

6. The guide according to claim 5, in which said roller guide includes at least an idle rollers module, comprising in turn an idle roller support frame adapted to support, in longitudinal succession, a plurality of shafts, each of which carries, in a freely rotating way, one or more of said idle rolling elements that, in use, are exposed to the contact with the transported articles.

7. The guide according to claim 1, in which said second element is also longitudinally extended and intended in use to be arranged along a transport path for the containment and/or the routing of the transported articles.

8. The guide according to claim 1, in which the inwardly facing portion of the first element and the inwardly facing portion of the second element have a longitudinal extension at least equal to that of the support bar.

9. A guide for conveying articles, comprising:
a first element for guiding an article along a transport path, said first element having a first portion;
a second element for guiding an article along a transport path, said second element having a second portion facing said first portion; and
a mounting assembly for mounting the first and the second elements to a support bar, said mounting assembly engaging edge portions of said first element and said second element and keeps the first and the second elements together with the support bar between the first portion of said first element and said second portion of said second element;
wherein said mounting assembly includes at least a first jaw element and a second jaw element, each of said first jaw element and said second jaw element engaging at least one edge portion of each of said first and second elements; and
wherein said first element comprises at least one of a roller guide and a static guide for engagement with the transported articles.

10. The guide according to claim 9, wherein said edge portions being opposed to each other in a direction transversal to the direction of longitudinal extension of the first element, and wherein upon urging the first and the second jaw elements one towards the other in said direction transversal to the direction of longitudinal extension, the first and the second jaw elements and the edge portions of the first and the second elements being shaped in such way that urging one towards the other of the first and the second jaw elements in said transversal direction clamping the support bar there between.

11. The guide according to claim 10, in which said edge portions of the first and second elements comprise appendixes bent with respect to said first and second portions, and said first and second jaw elements each comprise a substantially planar part and side wings bent and adapted to abut said bent appendixes.

12. A guide for conveying articles, comprising:
a first element for guiding an article along a transport path, said first element having a first roller module disposed on one side of said first element;
a second element for guiding an article along a transport path, said second element being disposed adjacent a second side of said first element opposing said one side of said first element; and
a mounting assembly for mounting the first and the second elements to a support bar, the support bar being interposed between said first and second elements, said mounting assembly keeping the first and the second elements together with the support bar there between;
wherein said mounting assembly includes at least a first jaw element engaging an edge portion of said first element and an edge portion of said second element, and a second jaw element engaging an opposed edge portion of said first element and an opposed edge portion of said second element.

13. The guide according to claim 12, wherein said edge portions and said opposed edge portions being opposed to each other in a direction transversal to the direction of longitudinal extension of the first element, and wherein upon urging the first and the second jaw elements one towards the other in said direction transversal to the direction of longitudinal extension, the first and the second jaw elements, the edge portions of the first and second elements, and the opposed edge portions of the first and the second elements being shaped in such a way that urging one towards the other of the first and the second jaw elements in said transversal direction urges the first and the second elements toward each other clamping the support bar there between.

14. The guide according to claim 13, in which said edge portions and said opposed edge portions of the first and second elements comprise appendixes bent with respect to substantially planar portions of said first and second elements, and said first and second jaw elements each comprise a substantially planar part and side wings bent and adapted to engage said bent appendixes.

* * * * *